(12) United States Patent
Todori et al.

(10) Patent No.: US 7,471,863 B2
(45) Date of Patent: Dec. 30, 2008

(54) NEAR-FIELD INTERACTION CONTROL ELEMENT

(75) Inventors: Kenji Todori, Yokohama (JP); Miho Maruyama, Yokohama (JP); Reiko Yoshimura, Kawasaki (JP); Fumihiko Aiga, Yokohama (JP); Tsukasa Tada, Hachioji (JP); Ko Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/690,989

(22) Filed: Mar. 26, 2007

(65) Prior Publication Data

US 2008/0107371 A1 May 8, 2008

(30) Foreign Application Priority Data

Jun. 8, 2006 (JP) ............................ 2006-160063

(51) Int. Cl.
*G02B 6/10* (2006.01)

(52) U.S. Cl. .................. 385/129; 385/142; 977/901; 977/778; 977/810

(58) Field of Classification Search ............ 385/1, 385/14, 129, 130, 141, 142; 977/773, 778, 977/813, 815, 824, 810, 862, 932, 901
See application file for complete search history.

(56) References Cited

U.S. PATENT DOCUMENTS 6,859,477 B2* 2/2005 Deppe et al. ............. 372/45.01

2005/0111805 A1* 5/2005 Hertz et al. ............... 385/125
2006/0065902 A1 3/2006 Todori et al.
2006/0067602 A1 3/2006 Todori et al.
2006/0163556 A1 7/2006 Yoshimura et al.
2006/0279833 A1 12/2006 Yoshimura et al.

FOREIGN PATENT DOCUMENTS

| JP | 2003-207667 | 7/2003 |
| JP | 2004-157326 | 6/2004 |
| JP | 2005-64201 | 3/2005 |

OTHER PUBLICATIONS

U.S. Appl. No. 11/690,989, filed Mar. 26, 2007, Todori et al.
U.S. Appl. No. 12/049,662, filed Mar. 17, 2008, Todori et al.

(Continued)

*Primary Examiner*—James P Hughes
(74) *Attorney, Agent, or Firm*—Oblon, Spivak, McClelland, Maier & Neustadt, P.C.

(57) ABSTRACT

A near-field interaction control element includes a near-field optical waveguide containing particles formed of a metal, a metal anion or a metal cation with a diameter of 0.5 nm or more and 3 nm or less and a dielectric constant of −2.5 or more and −1.5 or less, an electron injector/discharger injecting or discharging an electron into or from the particles contained in the near-field optical waveguide to vary a dielectric constant of the near-field optical waveguide, a near-field light introducing part introducing near-field light into the near-field optical waveguide, and a near-field light emitting part emitting the near-field light having guided through the near-field optical waveguide.

16 Claims, 5 Drawing Sheets

OTHER PUBLICATIONS

S. Yoshida, et al, "Optical Thin Films and Devices", Tokyo University Press, Sep. 20, 1994, pp. 116-119.

T. Kobayashi, "Non-linear Optical Measurement", Kabushiki Kaisha Gakai Syuppan Center, Dec. 20, 1996, p. 16.

L. Brossard, et al., Interplay between chains of S=5/2 localised spins and two-dimensional sheets of organic donors in the synthetically built magnetic multilayers $\lambda$--(BETS)$_2$FeCl$_4$, Eur. Phys. B 1998, vol. 1, pp. 439-452.

S. Uji, et al., "Magnetic-field-induced superconductivity in a two-dimensional organic conductor", Nature, vol. 410, Apr. 19, 2001, pp. 908-910.

\* cited by examiner

NEAR-FIELD INTERACTION CONTROL ELEMENT

CROSS-REFERENCE TO RELATED APPLICATIONS

This application is based upon and claims the benefit of priority from prior Japanese Patent Application No. 2006-160063, filed Jun. 8, 2006, the entire contents of which are incorporated herein by reference.

BACKGROUND OF THE INVENTION

1. Field of the Invention

The present invention relates to a control element for a near-field interaction between particles.

2. Description of the Related Art

Information transfer means have sequentially adopted light as a medium starting with long-distance communication. The prevalence of optical communication has shifted from infra-structures to fiber to the home (FTTH). Optical information communication is expected to be sequentially adopted for inter-device applications, inter-board applications, inter-chip applications, and intra-chip applications in the future. However, it is difficult to confine light in an area with a size equal to or smaller than its wavelength because of diffraction limit. Thus, a special technique is required to form an optical element between chips or in a chip.

Known techniques for controlling light in a very small area use near fields (micro-dot arry), plasmons (JP-A 2003-207667 (KOKAI)), or excitons (JP-A 2004-157326 (KOKAI)).

Development of nanophotonics functional elements has just been started, and a large number of near-field functional elements need to be researched and developed. Of particular concern is the control of a near-field interaction as well as a variation in a dielectric constant (the dielectric constant in the frequency range of light, i.e., refractive index) of a micro-substance which causes an interaction to excite a near-field. However, no conventional techniques can significantly control the dielectric constant, and various techniques are expected to be developed.

BRIEF SUMMARY OF THE INVENTION

According to an aspect of the present invention, there is provided a near-field interaction control element comprising: a near-field optical waveguide containing particles formed of a metal, a metal anion or a metal cation with a diameter of 0.5 nm or more and 3 nm or less and a dielectric constant of −2.5 or more and −1.5 or less; an electron injector/discharger injecting or discharging an electron into or from the particles contained in the near-field optical waveguide to vary a dielectric constant of the near-field optical waveguide; a near-field light introducing part introducing near-field light into the near-field optical waveguide; and a near-field light emitting part emitting the near-field light having guided through the near-field optical waveguide.

According to another aspect of the present invention, there is provided a near-field interaction control element comprising: a near-field optical waveguide containing particles formed of a substance which exhibits a phase transition from an insulator phase to a metal phase in response to irradiation with light, magnetic field change or temperature change, and with a diameter of 0.5 nm or more and 3 nm or less and a dielectric constant of −2.5 or more and −1.5 or less when they are subjected to the phase transition to the metal phase; a dielectric constant regulating part configured to exert irradiation with light, magnetic field change or temperature change on the particles contained in the near-field optical waveguide; a near-field light introducing part introducing near-field light into the near-field optical waveguide; and a near-field light emitting part emitting the near-field light having guided through the near-field optical waveguide.

DETAILED DESCRIPTION OF THE INVENTION

A detailed description will be given below of near-field interaction control elements in accordance with embodiments.

The interaction of near-field light differs from that of propagating light. Assume that two particles are present close to each other. The particles have a diameter of 0.5 nm or more and 3 nm or less. The spacing between the particles is equal to or smaller than the diameter of each particle. Forming particles of diameter smaller than 0.5 nm is difficult. Particles of diameter larger than 3 nm involve only a small variation in near-field interaction. It is known that a near-field interaction newly induced between two particles is proportional to a polarizability P. The polarizability P newly induced between the two particles is proportional to the polarizability α of each particle. The polarizability α of each particle is expressed by the following equation. Here, the damping item of decoherence is neglected.

$$\alpha = \left(\frac{(\varepsilon - 1)}{(\varepsilon + 2)}\right) \cdot a^3.$$

(see T. Saiki and Y. Toda, Optical properties in nano-scale materials, Ohmsha (2004)).

Figure 1:
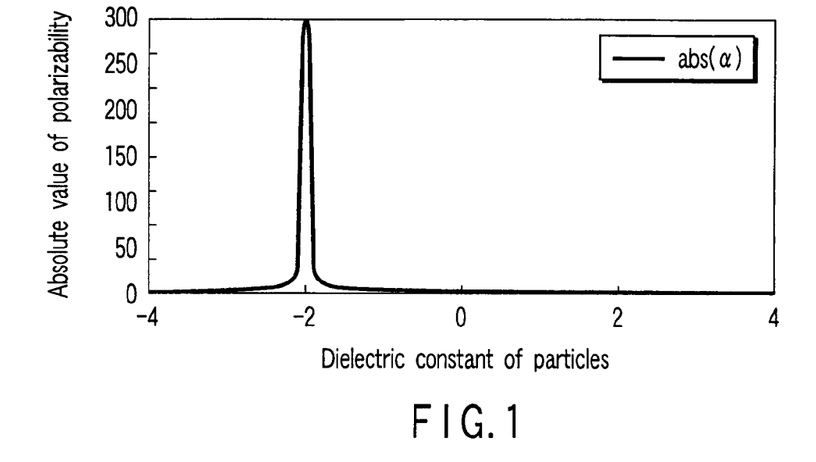
FIG. 1 is a graph showing dielectric constant dependence of a polarizability α of one particle.

In this equation, $\varepsilon$ denotes the dielectric constant of a particle, and "a" denotes a radius. FIG. 1 shows the dielectric constant dependence of polarizability of a particle. The figure shows that the assumption of absence of the damping item results in the divergence of the polarizability α at −2.

Figure 2A:
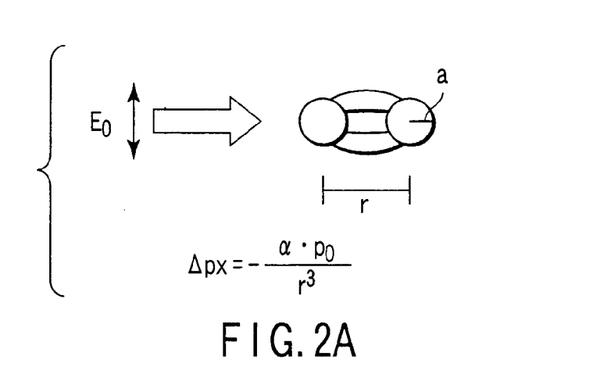
FIGS. 2A and 2B are diagrams showing the relationship between the alignment of two particles and the polarization direction of an optical electric field, and near-field induced dipole moment coefficients Δpx and Δpy in an x-direction and a y-direction.
Figure 2B:
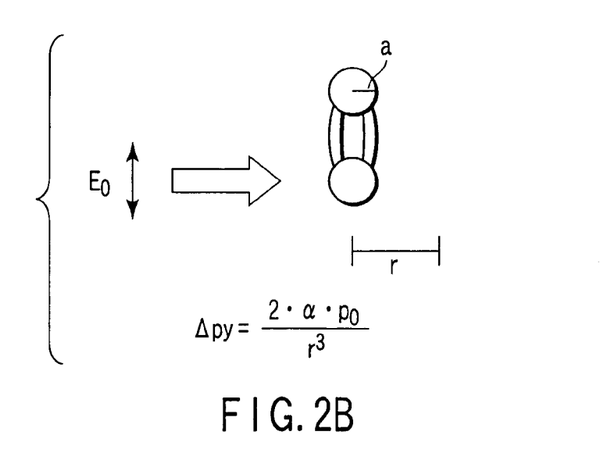

When two particles are present, irradiating one of the particles with light causes a near-field interaction between the two particles. The near-field interaction increases the polarizability P. The increase in polarizability P is expressed as near-field induced dipole moment coefficients Δpx and Δpy in an x-direction and a y-direction on the basis of the relationship between the alignment of the two particles and the polarization direction of an optical electric field as shown in FIGS. 2A and 2B.

$$\Delta p_x = -\frac{\alpha \cdot p_0}{r^3},$$

$$\Delta p_y = \frac{2 \cdot \alpha \cdot p_0}{r^3}.$$

Figure 3:
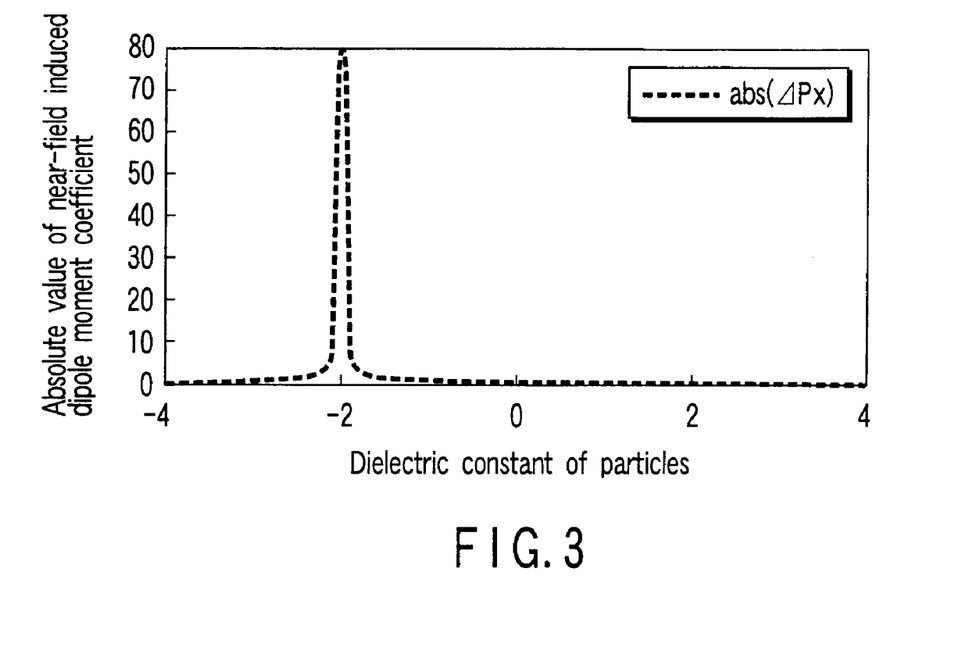
FIG. 3 is a graph showing the calculation of dielectric constant dependence of the absolute value of Δpx.
Figure 4:
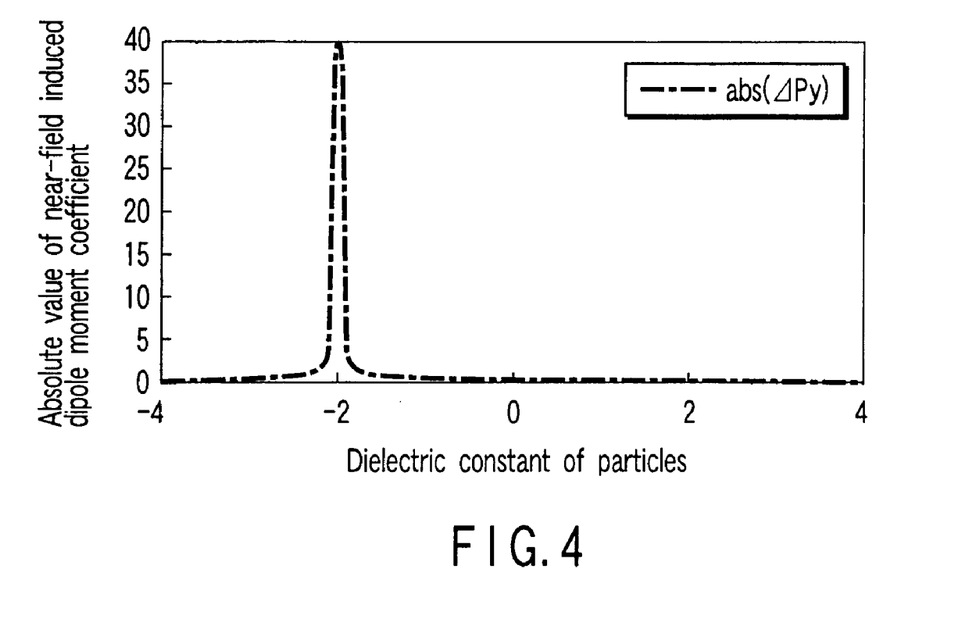
FIG. 4 is a graph showing the calculation of dielectric constant dependence of the absolute value of Δpy.

FIG. 3 shows the calculation of dielectric constant dependence of the absolute value of Δpx. FIG. 4 shows the calculation of dielectric constant dependence of the absolute value of Δpy.

As shown in FIGS. 3 and 4, both Δpx and Δpy diverge significantly when the particles have a dielectric constant of −2. Therefore, it is concluded that the interaction between particles can be drastically changed by enabling the dielectric constant of the particles to be varied close to 2, specifically, within the range of −2.5 or more and −1.5 or less. By the way, a dielectric constant of a negative value indicates that the substance is metal.

One of the methods for controlling the dielectric constant of a substance utilizes a nonlinear optical effect. However, the nonlinear optical effect varies the dielectric constant by substantially 1% or less. This means that the dielectric constant is not virtually varied by the nonlinear optical effect.

In contrast, for substances exhibiting coulomb blockade, a proposed method utilizes injection or discharge of electrons to vary the electron orbit to significantly vary the refractive index, that is, the dielectric constant of propagating light (JP-A 2005-156922 (KOKAI)). Further, besides the substances found to exhibit coulomb blockade, substances have been discovered which vary the refractive index (i.e., the dielectric constant) of propagating light when subjected to similar electron injection. Examples of these substances include a combination of a cation of an element whose electron shell of an occupied orbit is changed by electron injection and an acceptor, a metal chelate complex, and metallocene and its derivatives. With some of these substances, the refractive index (dielectric constant) varies by more than 1%, or in some cases, more than 10%.

A variation in dielectric constant based on the above principle will be described in detail. An optical constant such as the dielectric constant is determined by the electron orbit of a substance. In particular, the optical constant is markedly affected by the outermost electron shell orbit. Accordingly, the dielectric constant can be greatly varied by a method for significantly varying the electron orbit of the outermost shell.

Description will be given of substances for which the outermost shell electron orbit is markedly varied by electron injection. Quantum dots may be used in order to significantly vary the state of the electron orbit by means of electron injection compared to the state before the injection. Quantum dots mean particles having a size in the order of nanometer or less as well as discrete energy levels. Quantum dots may include organic molecules provided that they have discrete energy levels. Thus, the quantum dots may be metal nanoparticles, semiconductor nanoparticles, or organic molecules. A typical material for the quantum dots is at least one nanoparticle material selected from the group consisting of metals such as Cu, Au, Ag, Fe, Ni, Co, Zn, Cr, W, Ti, Al, In, Ir, Mn, Mo, Bi, and Pt; Si, Ge, Sn, Pb, and diamond; III-V compound semiconductors such as GaAs, AlAs, InAs, GaP, and InSb; and II-VI compound semiconductors such as ZnS, ZnSe, ZnTe, CdS, CdSe, and CdTe. Owing to their small size, the quantum dots exhibit a lower state density than a bulk material at each energy level. Each electron injected into the quantum dots thus exerts a higher effect. Among the above materials, the metals involve the significant dispersion of the refractive index and have a dielectric constant of close to −2 in any of an ultraviolet wavelength region, a visible wavelength region, and an infrared wavelength region. The dielectric constant may be close to −2 in any of a neutral state, an anionic state with an electron injected into the material, and a cationic state with an electron discharged from the material. In particular, for gold, silver and copper, surface enhanced Raman scattering (SERS) and tip enhanced Raman scattering (TERS) have been reported. This also indicates that gold, silver and copper exhibit a higher interaction between the near-field and plasmon and a higher effect due to the interaction.

The strength of the near-field interaction can also be varied by use of a substance capable of taking a positive and negative dielectric constants and having a value close to −2 (−2.5 or more and −1.5 or less) when it takes a negative value. For example, substances can be used which cause insulator-to-metal phase transition in response to light irradiation, magnetic field change or temperature change. Further, the characteristics of metal result from the plasmon effect of free electrons. However, metal nanoparticles with a smaller size fail to excite plasmons and thus tend to be insulating. Thus, nanoparticles having a size of less than 1 nm corresponding to the boundary between the metal and insulator can cause phase transition such that particles in an insulator phase are changed into a metal phase by means of electron injection or particles in a metal phase are changed into an insulator phase by means of electron discharge.

If dielectric constant of particles could be varied within a range close to −2 (i.e., −2.5 or more and −1.5 or less) by use of any of the above substances, the interparticle interaction can be efficiently controlled to produce elements such as switches.

Similar effects can also be produced by providing an electron injector/discharger corresponding to a part of a near-field optical waveguide and varying the dielectric constant of the part of the near-field optical waveguide to form a distribution or shape with a different refractive index by which a near field can be excited. In this case, as a material for the particles other than those described above, use may be made of at least one selected from the group consisting of oxides such as $TiO_2$ and ZnO, and organic and inorganic molecules such as $C_{60}$, carbon nanotube, ferrocene, nickelocene, $Na_2SO_4$, $CH_3COONa$, $CH_3COOK$, $(COONa)_2$, CuCl, $CH_3COOAg$, $MgSO_4$, $CaSO_4$, $(COO)_2Ca$, $ZnSO_4$, $ZnCl_2$ and $(COO)_2Zn$.

Where metal particles are arrayed and exhibit a significant interparticle near-field interaction, energy transfer, that is, information transfer, can be achieved by plasmons. Since the information transfer with plasmons is not influenced by diffraction limit, unlike the case with light, thinner wire can be used for the particular information transfer. In energy transfer with the arrayed metal particles, application of light to a part of the arrayed particles excites plasmons which propagate energy. However, what is transferred is the energy, but electrons are not transferred though plasmon oscillation is established. In other words, a plasmon mode is set up in the arrayed particles (S. A. Maier et al., Phys. Rev. B 65, 193408 (2002);

S. A. Maier et. al., Adv. Mater., 13, 19, 1501 (2001); S. A. Maier et. al., Proceedings of SPIE, 4456, 22, (2001)). The array of particles is not limited to a one-dimensional one. The particles may be two-dimensionally, densely arrayed.

EXAMPLES

Examples of the present invention will be described with reference to the drawings.

Example 1

Particles have a negative dielectric constant means that they are metal. However, particles with a smaller size fail to excite plasmons to become dielectric. But then, if electron injection increases the number of electrons and electron repulsion increases the size of the electron orbit to generate plasmons, the dielectric constant changes from positive value to negative value to vary the interparticle interaction.

Figure 5A:
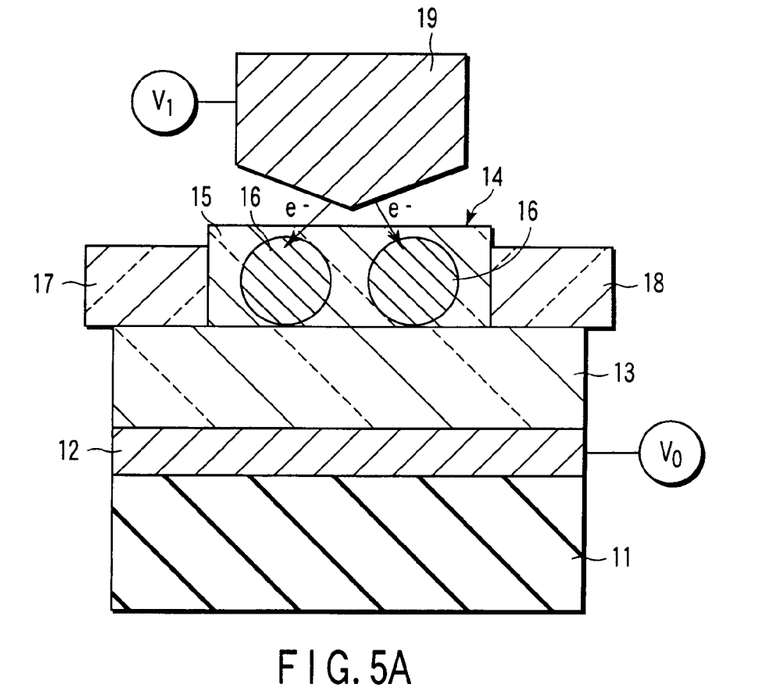
FIGS. 5A and 5B are a cross-sectional view and a plan view, respectively, showing the near-field interaction control element in Example 1.
Figure 5B:
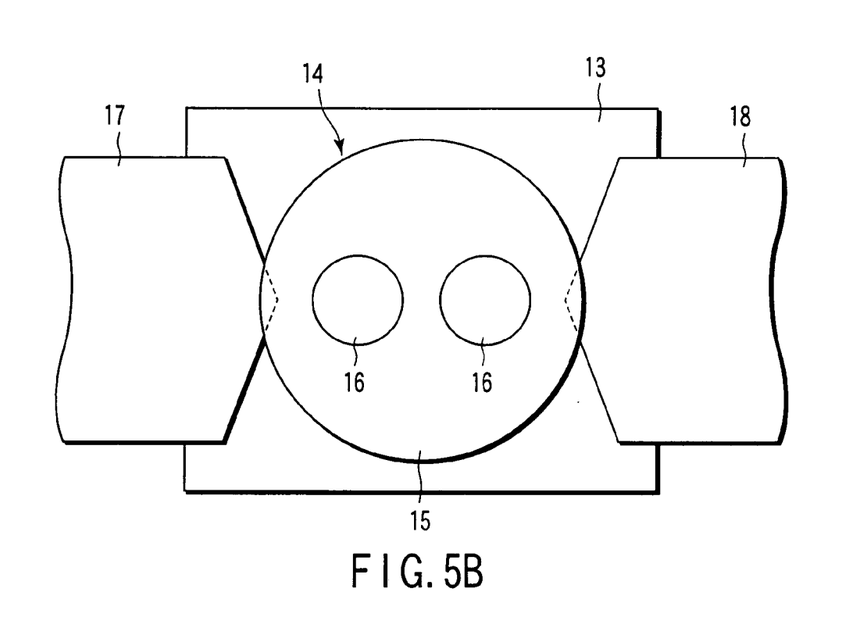

A near-field interaction control element shown in FIGS. 5A and 5B is fabricated. FIG. 5A is a cross-sectional view, and FIG. 5B is a plan view. An electrode layer 12 and an insulating layer 13 are formed on a substrate 11. A near-field optical waveguide 14 is formed on the insulating layer 13. The near-field optical waveguide 14 is composed of a $SiO_2$ layer 15 in which two Ti particles 16, 16 are arrayed. Each of the particles 16, 16 has a diameter of about 0.8 nm, and the space between the particles 16, 16 is about 0.5 nm. A near-field light introducing part 17 and a near-field light emitting part 18 are provided at both ends of the near-field optical waveguide 14. The near-field light introducing part 17 and near-field light emitting part 18 are each formed of a planar waveguide made of $SiO_2$. The tip of the near-field light introducing part 17 is sharpened in the vicinity of one of the particles 16. The tip of the near-field light emitting part 18 is sharpened in the vicinity of the other particle 16. An electron injector 19 is arranged above the near-field optical waveguide 14. The electron injector 19 is an Au-coated cantilever of an atomic force microscope (ATM).

If electrons are injected from the electron injector 19 into the Ti particles 16, 16 in the near-field optical waveguide 14 by applying a voltage between the electrode 12 and the electron injector 19, the dielectric constant of the particles 16, 16 is changed closer to −2. When propagating light is guided through the near-field light introducing part 17, the propagating light is converted into near-field light at the tip of the near-field light introducing part 17. The near-field light excites one of the particles 16 to induce an interaction between the particles 16, 16, so that the near-field light is transferred to the other particle 16. Then, the near-field light is emitted from the near-field light emitting part 18.

Continuous-wave laser light of wavelength 632.8 nm is allowed to enter the near-field optical waveguide 14 through the near-field light introducing part 17. With the intensity of near-field light monitored which is emitted from the near-field light emitting part 18, a sinusoidal voltage of 50 kHz is applied between the electrode 12 and the electron injector 19 in order to inject electrons into the near-field optical waveguide 14. As a result, the monitored intensity of the near-field light is found to be modulated into a sinusoidal shape with the same frequency as the applied sinusoidal voltage.

Example 2

A near-field interaction control element is fabricated which has the same structure as that in Example 1 except that the near-field optical waveguide is formed of an $SiO_2$ layer in which five Ti particles are arrayed at an equal space of 0.5 nm. When a similar experiment to that in Example 1 is carried out, a similar result to that in Example 1 is provided.

Example 3

Figure 6:
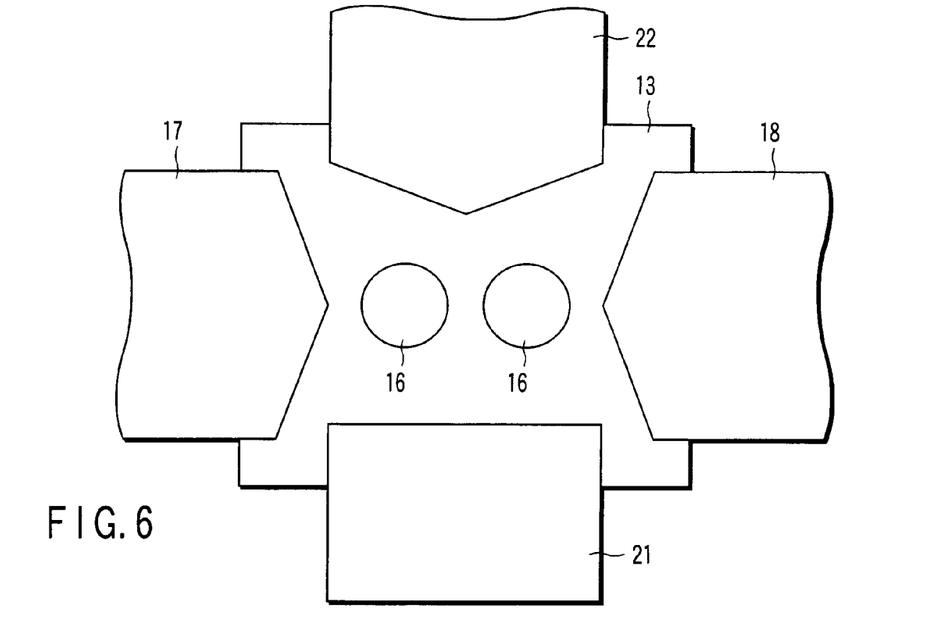
FIG. 6 is a plan view showing the near-field interaction control element in Example 3.

FIG. 6 shows a plan view of a near-field interaction control element in Example 3. This near-field interaction control element has the same structure as that in Example 1 except that, instead of the electrode 12 and electron injector 19 in Example 1, an electron injector is constructed by arranging an aluminum electrode 21 having a flat tip and an aluminum electrode 22 having a tip sharpened by a focused ion beam (FIB) apparatus so that the particles 16, 16 are sandwiched by the aluminum electrodes 21 and 22 in the plane where the particles 16, 16 are located. When a similar experiment to that in Example 1 is carried out, a similar result to that in Example 1 is provided.

In a case where an electron gun is used to inject electrons instead of providing a pair of electrodes, a similar result is also provided.

Example 4

A near-field interaction control element is fabricated which has the same structure as that in Example 1 except that Au particles are used in place of the Ti particles in Example 1. When a similar experiment to that in Example 1 is carried out, a degree of modulation higher than in Example 1 is provided.

In a near-field interaction control element using Ag particles in place of the Ti particles in Example 1, a higher degree of modulation than that using the Au particles is provided.

Example 5

[Ni(chxn)$_2$Br]Br$_2$ [chxn=1R,2R-diaminocyclohexanediamine] (S. Iwai, Kotai Butsuri, 38, No. 10, 29 (2003)), and (EDO-TTF)$_2$PF$_6$ [EDO-TTF=ethylenedioxytetrathiafulvalene] (K. Onda et al., Journal of Physics: Conference Series 21, 216 (2005)) are materials exhibiting photo-induced phase transition, the dielectric constants of which can be varied from a positive value to a negative value (close to −2) by irradiation with light.

Figure 7A:
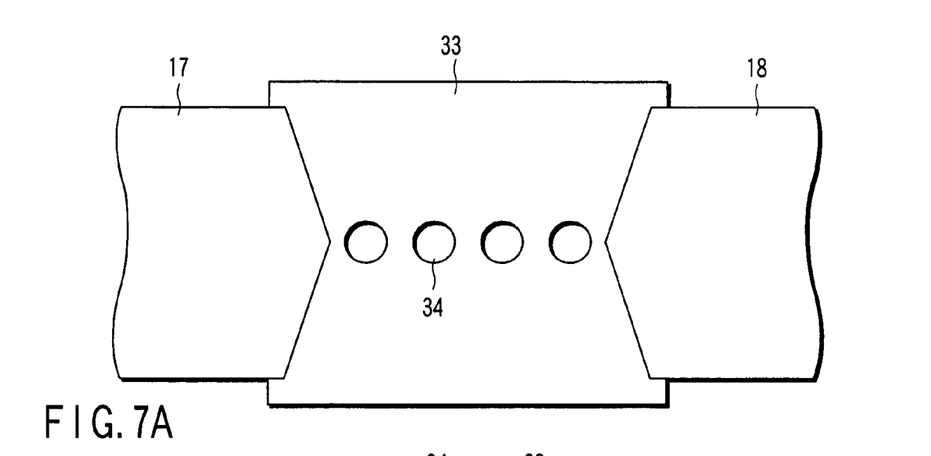
FIGS. 7A and 7B are a plan view and a cross-sectional view, respectively, showing the near-field interaction control element in Example 5.
Figure 7B:
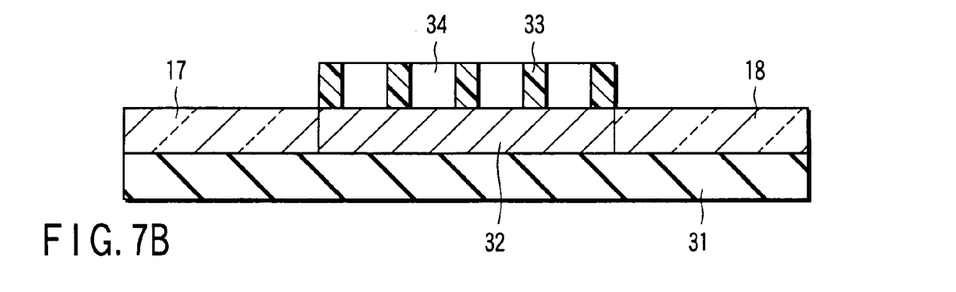

A near-field interaction control element shown in FIGS. 7A and 7B is fabricated. FIG. 7A is a plan view, and FIG. 7B is a cross-sectional view. A [Ni(chxn)$_2$Br]Br$_2$ film used as a near-field optical waveguide 32 is formed on a substrate 31. A near-field light introducing part 17 and a near-field light emitting part 18 are provided at both ends of the near-field optical waveguide 32. A resist mask 33 is formed on the near-field optical waveguide 32. Four circular openings 34 with a diameter of 100 nm are arrayed between the tip of the near-field light introducing part 17 and the tip of the near-field light emitting part 18. The space between the two adjacent openings 34 is 50 nm.

Continuous-wave laser light is allowed to enter the near-field optical waveguide 32 through the near-field light introducing part 17, and near-field light emitted from the near-field light emitting part 18 is observed. In this condition, no output near-field light is observed. Then, the near-field optical waveguide 32 is irradiated with pulsed laser light with a wavelength of 800 nm, a pulse width of 100 fsec and a cycle frequency of 80 MHz through the openings 34 in the resist mask 33. As a result, a pulsed output of near-field light with a time width of about 5 psec is observed corresponding to the cycle frequency of the pulsed laser light.

Similar effects are observed when $(EDO-TTF)_2PF_6$ is used in place of $[Ni(chxn)_2Br]Br_2$.

Example 6

Figure 8:
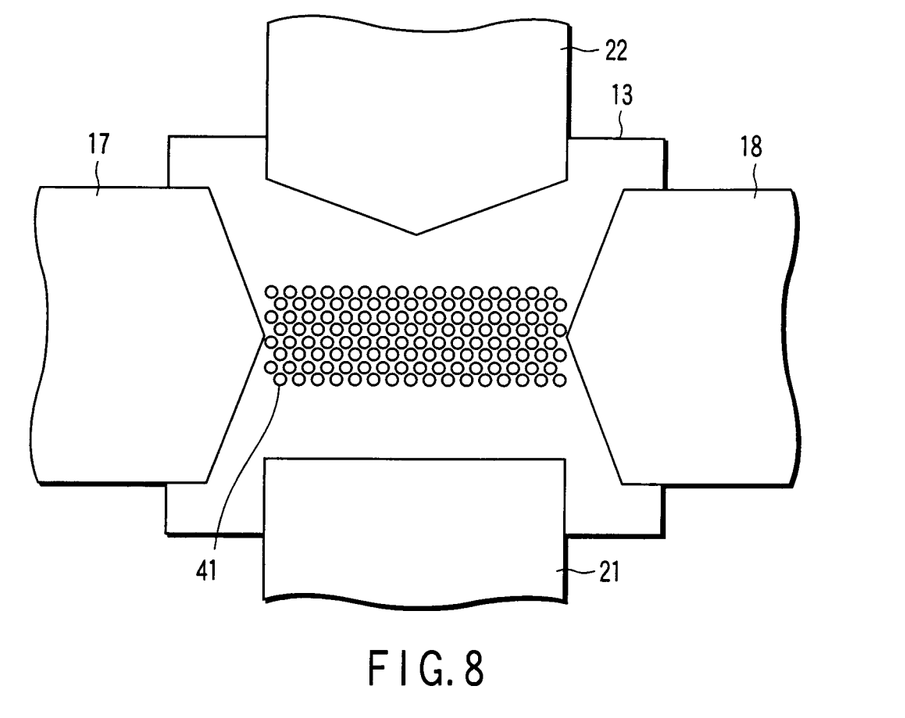
FIG. 8 is a plan view showing the near-field interaction control element in Example 6.

FIG. 8 shows a plan view of a near-field interaction control element in Example 6. This near-field interaction control element has a plasmon waveguide in which a large number of Au particles 41 are two-dimensionally arrayed instead of the two Ti particles in Example 3. The plasmon waveguide is formed by a sol-gel process using tetraethoxysilane, used as a material for a transparent matrix, as well as $HAuCl_4.4H_2O$. Au particles 41 with an average particle size of about 2.5 nm are two-dimensionally arrayed in the plasmon waveguide. The space between the adjacent Au particles 41 is smaller than the diameter of the Au particle 41. Also with this near-field interaction control element, modulation of light transfer in response to application of an electric field is observed.

Example 7

$\lambda$-$(BETS)_2FeCl_4$ [BETS =bis(ethylenedithio)-tetraselenafulvalene] is a metal at room temperature but exhibits a phase transition at 8K (absolute temperature) or lower to become an insulator (L. Brossard et. al., Eur. Phys. J. B 1, 439 (1998)). Then, application of a magnetic field of 10 Tesla or more causes a phase transition from the insulator to the metal. To take an advantage of these characteristics, a near-field interaction control element is fabricated which has a similar structure to that in Example 6 except that use is made of a plasmon waveguide formed of water glass in which $\lambda$-$(BETS)_2FeCl_4$ crystals are dispersed. In this near-field interaction control element, light transfer is observed at room temperature, but it is lost at 8K or lower. In this condition, when a magnetic field of 15 Tesla is then applied, light transfer is observed again.

Example 8

Similar effects are observed when a monolayer of $Au_{55}[P(C_6H_5)_3]_{12}Cl_6$ molecules (H. Zhang et al., New Journal of Physics 5, 30 (2003)) is used in place of the Au particles. $Au_{55}[P(C_6H_5)_3]_{12}Cl_6$ includes an $Au_{55}$ core to which triphenylphosphine groups are bonded so as to form a shell. In this case, the diameter of the core is 1.4 nm, and the diameter of the shell is 2.1 nm.

For $Au_{11}(PPh_3)_8Cl_3$, the diameter of the core is $0.8\pm0.2$ nm, and the shell is 1.4 nm.

Example 9

Figure 9:
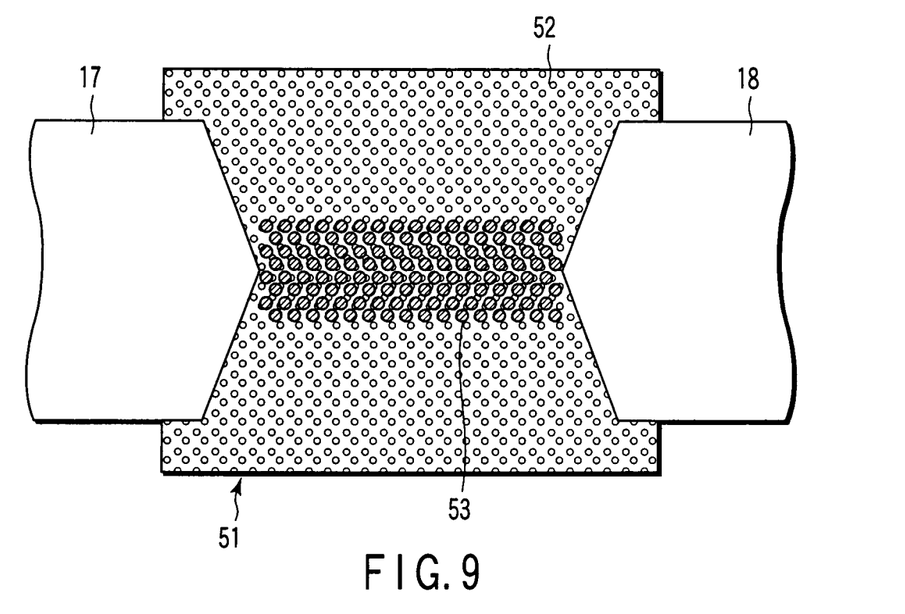
FIG. 9 is a plan view showing the near-field interaction control element in Example 9.

FIG. 9 shows a plan view of a near-field interaction control element in Example 9. As shown in FIG. 9, a lower electrode (not shown) and a near-field optical waveguide 51 are formed on a substrate (not shown). The near-field optical waveguide 51 is formed of a polystyrene (PS) film with a thickness of 50 nm in which $C_{60}$ particles 52 are dispersed. A near-field light introducing part 17 and a near-field light emitting part 18 are provided at both ends of the near-field optical waveguide 51. An upper electrode is formed on the near-field optical waveguide 51. Both lower electrode and upper electrode include a large number of two-dimensionally arrayed circular electrodes 53 with a diameter of 100 nm. The space between the adjacent circular electrodes is 50 nm. When a voltage of 200V is applied to a part of the near-field optical waveguide 51 between the lower electrode and the upper electrode, near-field light transfer is observed.

A similar result can also be observed when a nitrophenyl-ferrocene/polymethylmethacrylate (PMMA) film, a $CH_3COONa$/polyvinyl alcohol (PVA) film, or $CH_3COOK$, $(COONa)_2$/PVA film is used in place of the $C_{60}$/PS film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A near-field interaction control element comprising:
   a near-field optical waveguide containing particles formed of a metal, a metal anion or a metal cation with a diameter of 0.5 nm or more and 3 nm or less and a dielectric constant of −2.5 or more and −1.5 or less;
   an electron injector/discharger injecting or discharging an electron into or from the particles contained in the near-field optical waveguide to vary a dielectric constant of the near-field optical waveguide;
   a near-field light introducing part introducing near-field light into the near-field optical waveguide; and
   a near-field light emitting part emitting the near-field light having guided through the near-field optical waveguide.

2. The element according to claim 1, wherein the near-field optical waveguide comprises an insulating layer in which the particles are dispersed.

3. The element according to claim 1, wherein the particles are one-dimensionally arrayed.

4. The element according to claim 1, wherein the particles are two-dimensionally arrayed.

5. The element according to claim 1, wherein the particles are formed of at least one selected from the group consisting of Cu, Au, Ag, Fe, Ni, Co, Zn, Cr, W, Ti, Al, In, Ir, Mn, Mo, Bi, Pt, Si, Ge, Sn, Pb, diamond, III-V compound semiconductors, and II-VI compound semiconductors.

6. The element according to claim 5, wherein the III-V compound semiconductor is selected from the group consisting of GaAs, AlAs, InAs, GaP, and InSb.

7. The element according to claim 5, wherein the II-VI compound semiconductor is selected from the group consisting of ZnS, ZnSe, ZnTe, CdS, CdSe, and CdTe.

8. The element according to claim 1, wherein the particles are formed of gold or silver.

9. The element according to claim 1, wherein the electron injector/discharger includes a pair of electrodes sandwiching the near-field optical waveguide.

10. The element according to claim 9, wherein one of the electrodes has a sharpened tip.

11. The element according to claim 1, wherein the electron injector/discharger is provided corresponding to a part of the near-field optical waveguide to vary the dielectric constant of the part of the near-field optical waveguide.

12. A near-field interaction control element comprising:
   a near-field optical waveguide containing particles formed of a substance which exhibits a phase transition from an insulator phase to a metal phase in response to irradiation with light, magnetic field change or temperature change, and with a diameter of 0.5 nm or more and 3 nm or less and a dielectric constant of −2.5 or more and −1.5 or less when they are subjected to the phase transition to the metal phase;

a dielectric constant regulating part configured to exert irradiation with light, magnetic field change or temperature change on the particles contained in the near-field optical waveguide;

a near-field light introducing part introducing near-field light into the near-field optical waveguide; and a near-field light emitting part emitting the near-field light having guided through the near-field optical waveguide.

13. The element according to claim 12, wherein the near-field optical waveguide comprises an insulating layer in which the particles are dispersed.

14. The element according to claim 12, wherein the particles are one-dimensionally arrayed.

15. The element according to claim 12, wherein the particles are two-dimensionally arrayed.

16. The element according to claim 12, wherein the substance forming the particles are selected from the group consisting of $[Ni(chxn)_2Br]Br_2$, $(EDO-TTF)_2PF_6$, and $\lambda\text{-}(BETS)_2FeCl_4$.

* * * * *